United States Patent [19]

Tunison, Jr.

[11] 4,065,548
[45] Dec. 27, 1977

[54] PREPARATION OF ALKALI-METAL AZIDES

[75] Inventor: Donald E. Tunison, Jr., Corpus Christi, Tex.

[73] Assignee: PPG Industries, Inc., Pittsburgh, Pa.

[21] Appl. No.: 744,562

[22] Filed: Nov. 24, 1976

[51] Int. Cl.$^2$ ............................................. C01B 21/08
[52] U.S. Cl. .................................................. 423/410
[58] Field of Search ........................................ 423/410

[56] References Cited

U.S. PATENT DOCUMENTS 3,455,648  7/1969  Shaw et al. ........................... 423/410

FOREIGN PATENT DOCUMENTS 302,561   3/1920   Germany ............................. 423/410
25,353   11/1963   Japan ................................... 423/410

OTHER PUBLICATIONS

"Chemical Abstracts" vol. 54; 1960, p. 4225i & 4226.
Supplement To Mellor's Comp. Treatise on Inor. & Theoretical Chem.; Sup. II, vol. 8; John Wiley & Sons; N. Y., 1967, pp. 16–18.

*Primary Examiner*—G. O. Peters
*Attorney, Agent, or Firm*—Robert J. Grassi

[57] ABSTRACT

Alkali-metal azide is prepared and purified from a slurry of alkali-metal azide/alkali metal hydroxide double salt in liquid ammonia by settling a layer of double salt from the slurry, separating the balance of the slurry from the double salt layer, then dissolving the layer in water and recovering purified alkali-metal azide from the water solution by crystallization.

4 Claims, 1 Drawing Figure

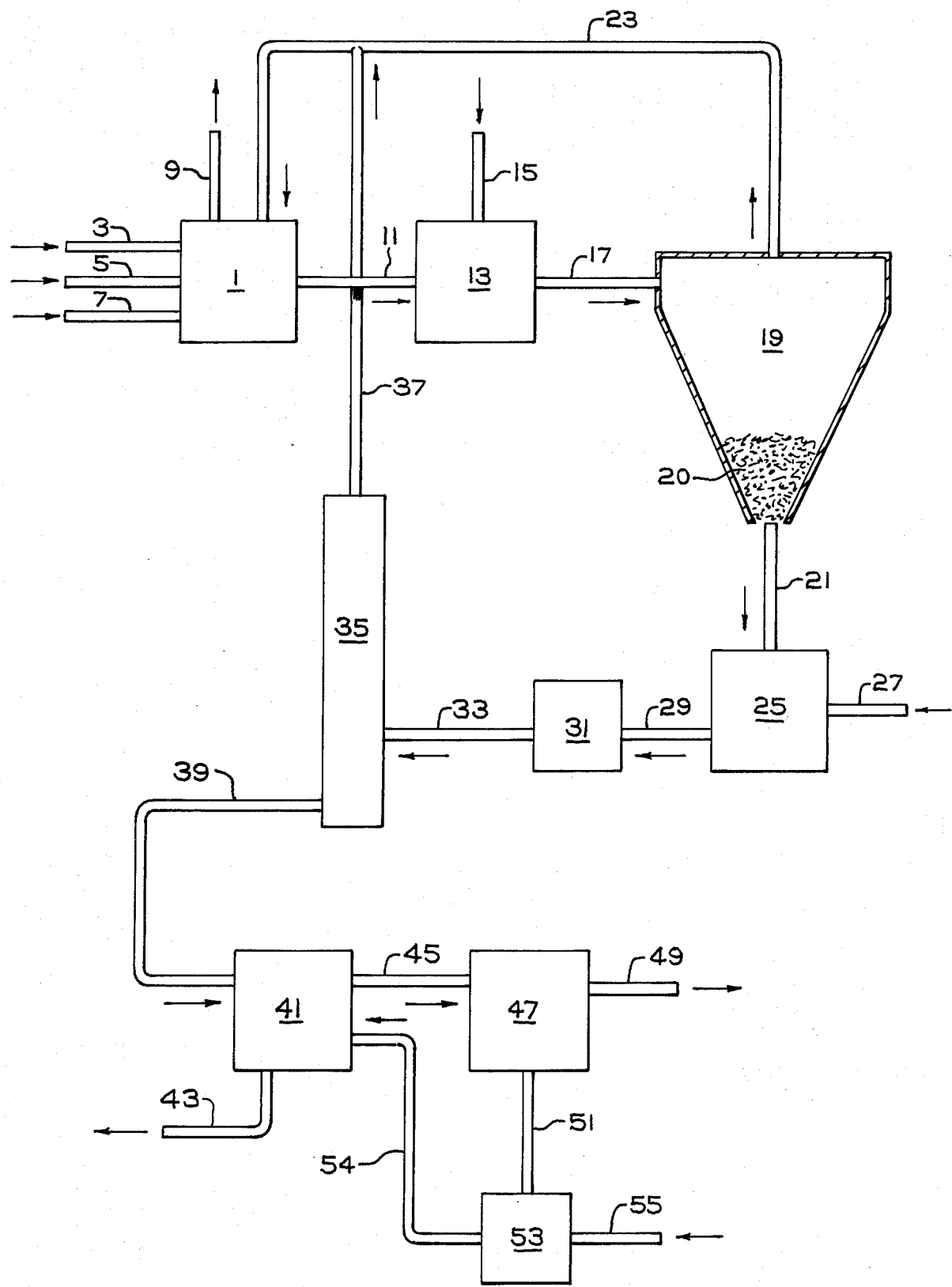

PREPARATION OF ALKALI-METAL AZIDES

BACKGROUND OF THE INVENTION

Alkali-metal azides are prepared from alkali-metal amide and nitrous oxide. An overall equation illustrative of the process is as follows:

$$2\text{-}NaNH_2 + N_2O \rightarrow NaN_3 + NaOH + NH_3 \qquad (I)$$

An azide synthesis process described by U.S. Pat. No. 2,373,800 issued to M. F. Acken et. al. forms sodium azide by the reaction of metallic sodium with excess liquid ammonia followed by reaction of nitrous oxide in the liquid ammonia medium with the so formed sodium amide. The sodium azide product is recovered at the completion of the reaction by adding sufficient methanol to destroy unreacted sodium amide, then evaporating the ammonia reaction medium.

Separation of suspended sodium azide particles from a liquid ammonia slurry has also been accomplished by contacting the slurry with mineral oil, allowing the azide particles to settle with the oil phase or travel through the oil phase for eventual recovery (see U.S. Pat. No. 3,953,582 issued to P. J. Astrawskas). According to another procedure (Japanese Patent Specification W.25353/63 published Nov. 28, 1963), azide removal from a liquid ammonia slurry has been enhanced by adding minor proportions of water to the slurry, but this necessitates subsequent removal of the excess water from the entire volume of liquid ammonia which formed the vehicle for the slurry if the liquid ammonia is to be reused as a solvent/reactant for metallic sodium in a sodium amide formation step.

It is desirable to provide a liquid ammonia based alkali-metal azide preparation and purification process which does not contaminate the azide product or require the inconvenience and expense of dehydrating the predominant part of the liquid ammonia media present during the synthesis cycle.

THE INVENTION

This invention concerns the preparation and purification of alkali-metal azides. In particular, this invention concerns the separation and purification of alkali-metal azide from a slurry of alkali-metal azide/alkali-metal hydroxide double salt in liquid ammonia media, notably from a slurry resulting from reaction of alkali-metal amide with nitrous oxide in liquid ammonia. More particularly, this invention is the preparation of high purity alkali-metal azide from alkali-metal, liquid ammonia and nitrous oxide reactants. This invention has particular applicability to a continuous integrated process for the preparation of sodium azide.

The process of this invention is practiced by settling a layer of alkali-metal azide/alkali-metal hydroxide double salt (hereinafter called "azide double salt") from a liquid ammonia slurry. The resulting azide double salt layer contains a minor portion of the slurry's total ammonia content since the balance of the ammonia is excluded from the layer during settling. The azide double salt layer is separated from the balance of the slurry and dissolved in water for eventual recovery of the azide by crystallization.

DETAILED DESCRIPTION OF THE INVENTION

In accordance with this invention, alkali-metal azide is recovered from an anhydrous or substantially anhydrous liquid ammonia medium containing azide in the form of azide double salt, which double salt is of limited solubility in anhydrous liquid ammonia. By virtue of this invention, recovery of the alkali-metal azide from such medium is accomplished without altering the substantially anhydrous nature of the liquid ammonia medium. As a consequence, much of the liquid ammonia may be used again directly in any of the alkali-metal azide process steps which are performed utilizing the anhydrous liquid ammonia. This capacity of so using the liquid ammonia is of considerable economic advantage since the handling and dehydration of aqueous liquid ammonia by distillation, cooling and compression is a significant energy consumer.

This invention concerns the purification of a dilute two component slurry having a solid insoluble component of alkali-metal azide double salt and a single phase liquid component consisting essentially of substantially anhydrous liquid ammonia.

Alkali-metals and alkali-metal cations suitable for use in this invention are selected from sodium, potassium, lithium, or mixtures thereof.

The solid component of the slurry is over 90 weight percent alkali-metal azide/alkali-metal hydroxide double salt with the possible copresence of undissolved alkali-metal, alkali-metal amide, alkali-metal hydroxide, alkali-metal azide, and catalyst.

The liquid component of the slurry consists essentially of substantially anhydrous liquid ammonia and is defined as being over 65 weight percent ammonia and over 95 weight percent of ammonia plus any solubilized alkali-metal azide. Typically, the liquid component is over 85 weight percent ammonia.

Sodium azide is readily soluble in liquid ammonia, however, the concurrent formation of sodium azide and sodium hydroxide by the reaction shown in equation (I) results in the formation of an insoluble alkali-metal azide/alkali-metal hydroxide double salt. This azide double salt has a composition of approximately one mole of alkali-metal azide per one mole of alkali-metal hydroxide. Under conditions of prolonged operation the liquid ammonia may gradually accumulate alkali-metal azide which is unassociated with alkali-metal hydroxide in the form of insoluble azide double salt. Eventually, the liquid ammonia's accumulation of unassociated alkali-metal azide will cease when the solubility limit of the alkali-metal azide is reached.

With the exception of water the balance of liquid component materials may be those which are not deleterious to the azide double salt settling step or the process related steps of azide double salt synthesis and alkali-metal amide systhesis. Ammonia solubilized compounds such as alkali-metal amide, alkali-metal hydroxide, alkali-metal azide double salt, and dissolved catalyst are exemplary of such materials. "Substantially anhydrous" liquid ammonia has a water content of less than 0.75 weight percent. Preferably, the water content of the liquid ammonia ranges from completely anhydrous to 0.5 weight percent. Water affects the utility of the liquid ammonia's direct reuse in other process steps preceding the settling of the azide double salt. For example, water reactive alkali-metals and alkali-metal amides are present in alkali-metal amide and alkali-metal azide syntheses steps.

The liquid slurry component is additionally designated as "single phase" to distinguish it from systems having other immiscible liquid phases used in conjunction with the liquid ammonia. For example, multiphase liquid systems employing oils in combination with liquid ammonia are not within the scope of this invention because they introduce additional steps or sources of azide product contamination.

The slurry is additionally characterized as "dilute" to describe the condition that the insoluble azide double salt is in the presence of a considerable excess of liquid ammonia and constitutes a settlable system. A "dilute" slurry contains less than 40 weight percent azide double salt based on the weight of slurry. Typical azide double salt slurry concentrations involved in the practice of this invention are within the range of 5 to 35 weight percent and more desirably between 10 to 25 weight percent.

The process of this invention may be used with an azide double salt/liquid ammonia slurry derived from any source. Typically, however, the process of this invention is the final step of the preparation and purification of alkali-metal azide in a low temperature liquid ammonia based synthesis scheme.

The process of settling a layer of double salt from a dilute slurry may be performed in any settling zone having provision for input of azide double salt slurry and means for separating the settled azide double salt layer from the supernatant slurry components. The settled layer of azide double salt precipitate may be separate from the liquid ammonia by withdrawing the upper layer of liquid component as by decantation or by removing the settled precipitate layer as by pumping or draining.

Gravitational settling of the solid slurry component is generally practical since the azide double salt has a density appreciably greater than the liquid ammonia. In the case of sodium azide/sodium hydroxide double salt a settling rate between 0.5 to 1.5 cm./minute is typical. If desired, the settling rate of the salt may be assisted by centrifugal devices, although gravitational settling is preferred because of ease of operation.

Settling of the azide double salt slurry may be conducted as either a batch or continuous operation. In a continuous operation the flow of materials in and out of the settling chamber must maintain sufficiently quiescent conditions for settling.

The azide double salt concentration of the settled azide double salt layer will depend on the degree of settling permitted, however, the compaction of the settled layer approaches a miximum with the passage of time. Practical settling times may be determined by experiment under conditions of use with the apparatus selected as a settling chamber. Assay of settled azide double salt layer samples taken at different time intervals will permit determination of optimum settling time.

The settled azide double salt layer generally will have an azide double salt concentration within the range of 55 to 75 weight percent based on the weight of the settled layer. Illustrative of the advantage accruing from operation of the process of this invention is the settling of a sodium azide/sodium hydrozide double salt slurry. A typical initial concentration of the sodium azide double salt slurry is 15 to 20 weight percent (80 to 85 weight percent ammonia). Settled sodium azide salt layer has an azide double salt content of about 65 weight percent (35 weight percent ammonia). Therefore, 86.5 to 90.5 weight percent of the ammonia originally associated with the azide double salt as liquid slurry component may be directly withdrawn from the settling chamber without further purification. The withdrawn liquid ammonia may advantageously be directly recycled to other steps of the azide purification process. In addition, the equipment, storage facilities, pumps and transfer lines employed for handling of settled layer may be of reduced size because of the reduced volume of materials to be treated.

Temperature is not critical in the operation of the azide double salt settling step, provided that the ammonia is maintained as a liquid. Ammonia liquifies under atmospheric pressure at about $-33°$ C. It is also convenient to maintain ammonia as a liquid by operation under moderate superatmospheric pressures of $615 \times 10^3$ Pa to $3400 \times 10^3$ Pa and temperatures in the range of 10 C. to 60° C.

The purification of the azide double salt layer is accomplished by a system of crystallizations from aqueous solution. Once the azide double salt layer has been segregated from the liquid component of the slurry it is dissolved in water. Upon solution the double salt disassociates into alkali-metal azide and alkali-metal hydroxide. The ammonia entrained in the azide double salt layer is dissolved by the water and may be recovered by distillation before the start of the crystallization. The distilled ammonia may then be reprocessed by cooling and compression to regenerate a substantially anhydrous liquid ammonia suitable for use in the azide process.

The crystallization may be effected by either cooling or evaporating the azide double salt aqueous solution. In the case of sodium azide double salt the sodium azide first crystallizes from solution and may be recovered as product. Thereafter, sodium azide double salt will crystallize from solution leaving a mother liquor of sodium hydroxide solution. The sodium azide double salt from the second crystallization is redissolved in water and the sequence of crystallization steps repeated to recover sodium azide product.

It is particularly advantageous to prepare alkali-metal azide by an integrated continuous three step low temperature liquid ammonia based process.

In the first step alkali-metal and liquid ammonia are reacted in the presence of a catalyst (e.g., iron salts) to form alkali-metal amide. Generally, the amide preparation is conducted in considerable excess liquid ammonia to achieve good conversion and reaction rates. For example, sodium amide is prepared by contacting liquid ammonia and metallic sodium in mole ratio of ten to one. This excess liquid ammonia employed in the first step usually determines the slurry concentrations employed in the remaining process steps.

In the second step the liquid ammonia slurry of alkali-metal amide is reacted with nitrous oxide to form alkali-metal azide. The alkali-metal azide combines with by-product alkali-metal hydroxide to form alkali-metal azide double salt.

In the third step the dilute slurry of azide double salt formed in step two is settled to form an azide double salt layer. The azide double salt layer is dissolved in water and the azide salt recovered by crystallization. The supernatant liquid ammonia excludedfrom the settled layer is directly recycled to the first step of the process.

Operating conditions, reactants and catalysts for the low temperature liquid ammonia based synthesis of alkali-metal amide and alkali-metal azide are set out in U.S. Pat. No. 2,163,100 to C. O. Miller et. al.; U.S. Pat. No. 2,373,800 to M. F. Acken et. al. and U.S. Pat. No. 2,994,583 to D. R. Levering the disclosures of which are incorporated herein by reference.

EXAMPLE

This example illustrates the rate of formation and composition of settled azide double salt layer formed by the process of this invention:

Azide double salt used in this experiment was prepared by reacting metallic sodium with a large excess liquid ammonia, and reacting the resultant sodium amide in liquid ammonia with nitrous oxide. The average particle size of the azide double salt was 75 microns. A slurry concentration of 20 weight precent azide double salt (based on the weight of slurry) was used in the following experiments:

Part A — Determination of Settling Rate:

Apparatus used for the settling determination was a thick-walled graduated glass rotometer tube of 12.7 mm. inside diameter and 35 cm. length. The tube had provision for sealing its content.

The method of employing the tube was to charge it approximately 9/10ths full of azide double salt slurry, seal the slurry in the tube, adjust the tube to ambient temperature, agitate the tube to evenly distribute the salt in the liquid ammonia medium, and finally fix the tube in a vertical position for test observations. The elapsed time for a slurry interface to initially descent 2.54 cm. was recorded. The test results are shown in Table I below.

Table I
Settling Rate of Azide Double Salt in Liquid Ammonia

| Test No. | Time (Seconds) | cm./minute Settling Rate |
|---|---|---|
| 1 | 142.7 | 1.067 |
| 2 | 183.2 | 0.836 |
| 3 | 165.2 | 0.922 |

Part B — Formation of Azide Double Salt Layer

A settling chamber was formed from a steel tube of 5.08 cm. inside diameter and 91.44 cm. length equipped with closeable inlet and outlet. The base of the chamber was provided with a 6.35 mm. diameter detachable tared sampling tube for withdrawing settled azide double salt layer samples.

the test was conducted by charging the settling chamber with slurry in the manner set out in Part A of this Example and fixing the chamber in a vertical position. Samples of settled salt layer were periodically withdrawn from the settling chamber in the tared sampling tube at the chamber's base. The net weight of the sample was calculated, then the ammonia content of the sample removed by controlled venting and gradual heating to 60° C. The calculated difference between the sample weight before and after ammonia removal was taken to represent the weight of azide double salt. Table II describes the results of the experiment.

Table II
Composition of Settled Azide Layer

| Time (Minutes) | Sample Weight (Grams) | Sample Weight After Ammonia Release (Grams) | Weight % Double Salt Solids In Settled Layer |
|---|---|---|---|
| 15 | 6.3 | 2.5 | 39.7 |
| 30 | 6.3 | 3.1 | 49.2 |
| 45 | 7.2 | 4.0 | 55.5 |
| 60 | 7.5 | 4.8 | 64 |
| 120 | 6.2 | 4.0 | 64.5 |
| 180 | 7.0 | 4.4 | 63 |

Part A of the Experiment demonstrates that azide double salt will gravitationally settle at a practical rate.

Part B of the Experiment demonstrates that azide double salt slurry originally containing 80 weight percent liquid ammonia may be settled to a layer containing 35 weight percent liquid ammonia.

By the practice of this example approximately 85.3% of the liquid ammonia has been removed from the azide double salt reaction product.

This invention will be more clearly understood from the following detailed description made in conjunction with the diagrammatic illustration of the FIGURE.

Into amide reactor 1 is fed metallic sodium via line 3, liquid ammonia via line 5 and iron salt catalyst, via line 7. By-product hydrogen is relieved through line 9 A product of sodium amide slurried in liquid ammonia from reactor 1 is sent via line 11 to azide reactor 13. Nitrous oxide is fed via line 15 into reactor 13 to form dilute azide double salt slurried in liquid ammonia. Thereafter, the azide double salt slurry is sent via line 17 to azide settling apparatus 19 where a gravitationally settled azide double salt layer 20 accumulates and is periodically withdrawn via line 21 to water dilution tank 25. Supernatant substantially anhydrous liquid ammonia from reactor 19 excluded from the settled layer is returned via line 23 to amide reactor 1. In tank 25 the azide salt layer 20 is dissolved in water supplied via line 27 and set to filter 31 via line 29 to remove catalyst residues or other insoluble materials. The filtered solution is sent via line 33 to still 35 where ammonia originally entrained in the azide double salt layer 20 is distilled, separated, dehydrated and recycled via line 37 to line 23 for reuse in the amide reactor. The distillant is sent via line 39 to a first crystallizer which precipitates sodium azide and the azide is withdrawn as product via line 43 for drying and packaging. The mother liquor from the first crystallizer 41 is sent to a second crystallizer 47 via line 45. Second crystallizer 47 precipitates azide double salt and removes a mother liquor of sodium hydroxide via line 49. The mother liquor is further processed to recover its residual azide content. Azide double salt precipitate of crystallizer 47 is sent via line 51 to water dilution tank 53 where the salt is dissolved in water supplied via line 55 and the resultant aqueous solution recirculated to first crystallizer 41 for separation of sodium azide product.

It is to be understood that although the invention has been described with specific references the specific details of embodiments thereof, it is not intended to be so limited since changes and alterations therein may be made which are within the full intended scope of this invention as defined by the appended claims.

I claim:

1. In a process for the preparation and purification of alkali-metal azide by contacting with water a dilute two component slurry having a solid insoluble component of alkali-metal azide/alkali-metal hydroxide double salt and a single phase liquid component consisting essentially of substantially anhydrous liquid ammonia to effect solution of at least a portion of said azide double salt and thereafter separating alkali-metal azide from the resultant solution; the improvement which comprises:

settling from said dilute slurry a layer of said double salt having a double salt concentration greater than said dilute slurry, separating said settled layer from supernatant slurry components excluded from the settled layer, then dissolving said layer in water to form a solution and thereafter recovering purified alkali-metal azide from said solution by crystallization.

2. The process of claim 1 where the alkali-metal is sodium.

3. The process of claim 1 where the dilute slurry contains 5 to 35 weight percent of alkali-metal azide-/alkali-metal hydroxide double salt based on the weight of slurry.

4. The process of claim 1 where the settled layer contains 55 to 75 weight percent of alkali-metal azide-/alkali-metal hydroxide double salt based on the weight of settled layer.

* * * * *